W. C. JILLSON & A. B. PALMER.

MACHINE FOR OPENING COTTON, &c.

No. 7,525. Reissued Feb. 20, 1877.

WITNESSES

Alexander Mahon

John G. Center.

INVENTORS

W. C. Jillson

Amos B. Palmer by A. M. Smith

Attorney

N. PETERS, PHOTO-LITHOGRAPHER, WASHINGTON, D. C.

UNITED STATES PATENT OFFICE.

WILLIAM C. JILLSON AND AMOS B. PALMER, OF WILLIMANTIC, CONN.

IMPROVEMENT IN MACHINES FOR OPENING COTTON, &c.

Specification forming part of Letters Patent No. 110,368, dated December 20, 1870; reissue No. 4,312, dated March 28, 1871; reissue No. 7,525, dated February 20, 1877; application filed February 8, 1877.

*To all whom it may concern:*

Be it known that we, WILLIAM C. JILLSON and AMOS B. PALMER, both of Willimantic, county of Windham, State of Connecticut, have invented certain new and useful Improvements in Machines for Opening Fibrous Material, of which the following is a full, clear, and exact description, reference being had to the accompanying drawing, making a part of this specification, in which—

Figure 1:
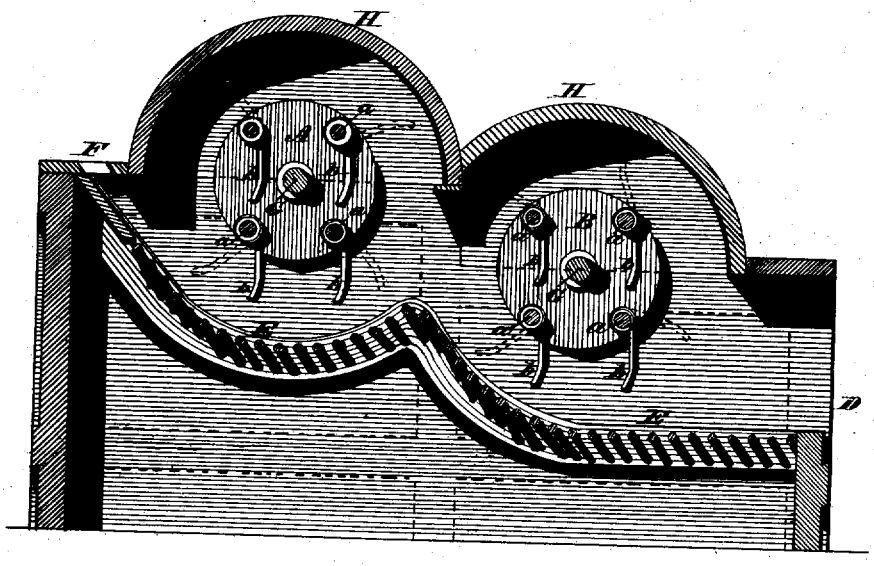
Figure 2:
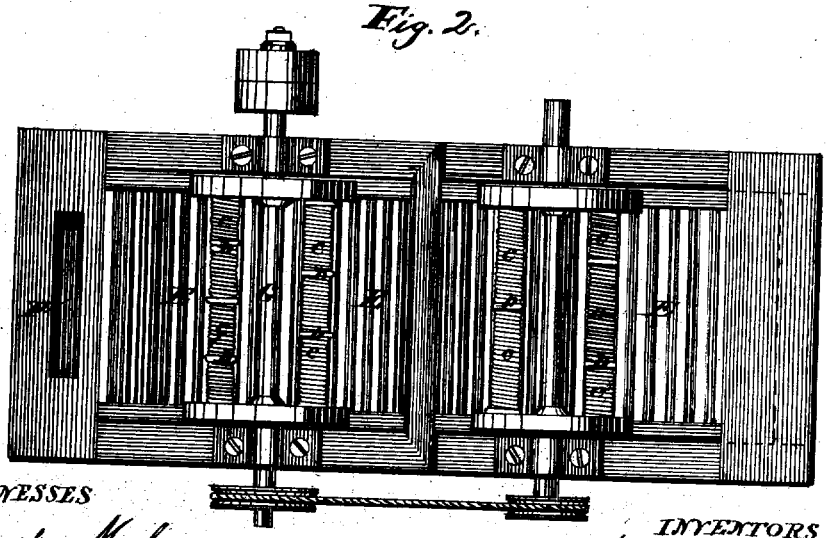

Figure 1 is a longitudinal sectional view of the machine, and Fig. 2 an upper plan view with the covering hoods or bonnets removed.

Similar letters of reference denote correponding parts wherever used.

The object of the invention is to open or loosen up and clean the fibrous material operated upon without injury to the staple, thereby putting it in condition to be more easily worked by the subsequent machinery employed in the various manufactures thereof; and to this end the invention consists in the employment, in a machine for opening up and cleaning fibrous material, of a series of revolving pivoted or yielding whipper-rods or beaters, arranged within an inclosing shell or case, for confining the material while being acted upon by said whipper-rods or beaters. These pivoted or yielding rods or beaters are attached by their ends to a rotating drum or reel, and, by preference, are so arranged that those of one row or series on the drum shall alternate with, or be set opposite, the spaces between those of the preceding series.

A B are sections of the skeleton drums. *a a* are the cross-bars connecting the drum-heads, and upon which the whippers are hung, and *b b* are the whippers, bent at one end to form an eye, which eye is slipped over the cross-bars before the drum is put together. The dotted lines show the position the whippers assume when in motion. C C are coils of wire or washers, also slipped over the cross-bars, and which serve to regulate the distance at which the whippers are to be set from each other, and also to arrange those of one row or series opposite to the spaces of those in the preceding row or series, or, in other words, in such manner as to "break joints" therewith, for preventing any portion of the fibrous material from escaping without being acted upon by some of the beaters. F is a slot or opening, through which the fibrous material to be operated on may pass, and this may or may not be furnished with feed-rolls, as desired. G G are the central shafts of the skeleton drums, and are journaled properly in the side of the machine frame or casing. E E are open screens beneath the drums. H H are the bonnets or hoods which form the upper portion of the cylinder inclosing the whippers.

The operation of this machine will be readily understood. The fibrous material is passed in at F, and the whippers loosen or lighten it up, and in turn pass it out at D; or, if desired, it can be passed out between two rollers, and over an apron. Each one of these arms being independently attached, if either of them is clogged or filled up it does not affect the working of the others. Thus the fiber cannot possibly be torn or injured.

We are aware that revolving shafts with radial projecting arms are old in cotton-openers; but their operation was very imperfect for two reasons: first, because, from their being rigid and unyielding, they injured the staple by breaking it, and thus shortening it to such an extent as to largely diminish its value; and, secondly, on account of their rigidity, they sometimes, when they came in contact with stones or bits of iron, which are frequently found in raw cotton, set the machine on fire. These two defects, which so seriously impaired the usefulness of this class of machines, are entirely obviated by adapting the whippers to readly yield when they meet with an obstruction; and the strength of the blow which is struck by the arms is thus regulated by the weight and velocity of the whipper. We are also aware that a long thin piece of metal has been loosely hung on a drum for opening cotton; but this is objectionable for the reason that clogging of the fibrous material at any one point on the bar affects the entire bar, and thus the staple is torn and injured; but we are not aware of any such machine in which yielding or pivoted whipping rods or arms are used.

Having now described our invention, what we claim as new, and desire to secure by Letters Patent, is—

1. In a machine for opening fibrous material, the combination, with an inclosing shell or case, of a series of yielding whipper rods or arms, arranged and rotating within said shell or case, substantially as and for the purpose described.

2. In a machine for opening fibrous material, the combination of revolving pivoted whipper rods or arms and an inclosing shell or case for confining the fibrous material while being acted upon by the whippers, all substantially as described.

3. In a machine for opening fibrous material, two or more reels or pulleys, provided with hinged or pivoted whipping-rods, in combination with two or more shells or concaves, these parts being constructed and arranged substantially as shown and described, whereby the material, after being partially opened by the first set of whippers, shall be fed to the second set of whippers by the action of the first, substantially as set forth.

4. In combination with the whipper-rods and reel-bars, constructed as shown, the elastic sleeves for separating the whipper-rods, and allowing them to yield laterally, substantially as set forth.

5. In a machine for opening fibrous material, the combination, with a rotating drum, of the several rows or series of yielding whipper rods or arms, the rods or arms of one row or series being arranged out of line with those of the preceding row or series, substantially as and for the purpose described.

WILLIAM C. JILLSON.
AMOS B. PALMER.

Witnesses:
J. A. CULVERHOUSE,
OLIVER H. K. RISLEY.